C. W. EBELING.
FILM CONTROLLED MECHANISM FOR MOTION PICTURE AND SOUND REPRODUCING MEANS.
APPLICATION FILED MAR. 24, 1915.
1,184,935.
Patented May 30, 1916.
2 SHEETS—SHEET 1.
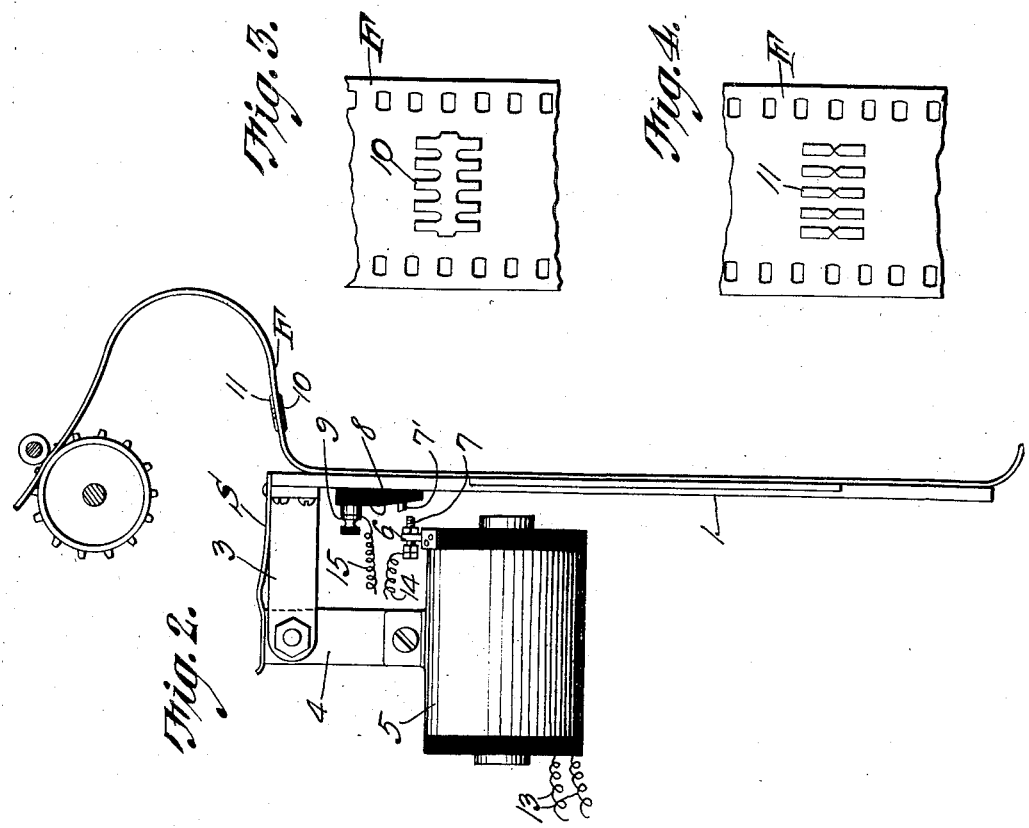
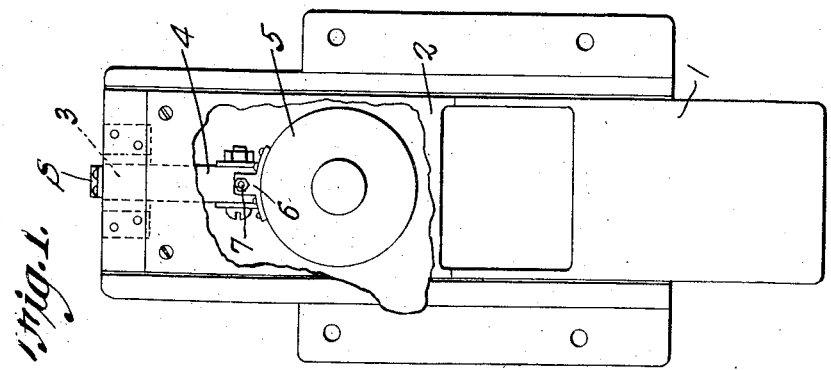
Inventor
Charles W. Ebeling

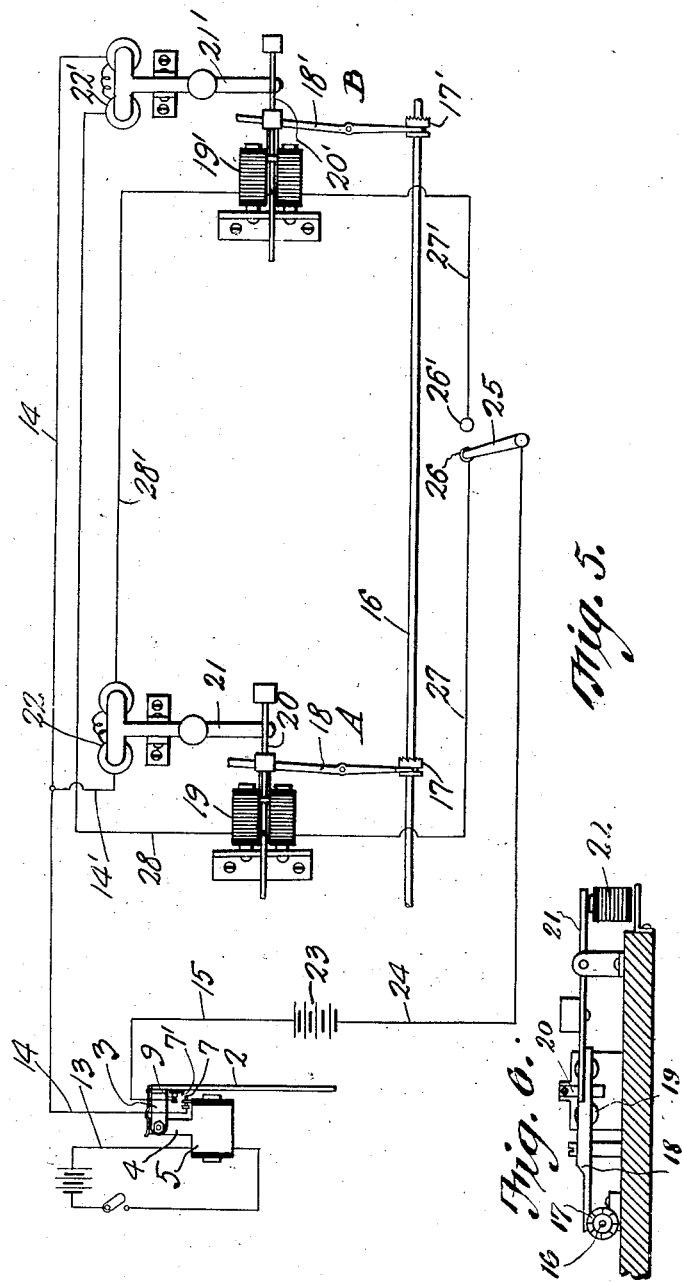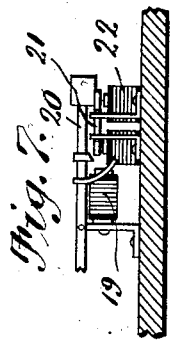

UNITED STATES PATENT OFFICE.

CHARLES W. EBELING, OF ELM GROVE, WEST VIRGINIA.

FILM-CONTROLLED MECHANISM FOR MOTION-PICTURE AND SOUND-REPRODUCING MEANS.

1,184,935.

Specification of Letters Patent. Patented May 30, 1916.

Application filed March 24, 1915. Serial No. 16,704.

*To all whom it may concern:*

Be it known that I, CHARLES W. EBELING, a citizen of the United States, residing at Elm Grove, in the county of Ohio and State of West Virginia, have invented certain new and useful Improvements in Film-Controlled Mechanism for Motion-Picture and Sound-Reproducing Means, of which the following is a specification, reference being had therein to the accompanying drawing.

This invention relates to a means whereby the film of a motion picture projecting machine automatically controls the connection and disconnection of a sound reproducing mechanism, so that the operation of the two will be in synchronism, one object of the present invention being the provision of a means whereby the film is not weakened, and whereby no extra pull or strain is placed upon the film while moving through the projecting machine, and yet the operation of the connecting and disconnecting mechanism is made positive.

There have been devised many ways of operating from a film clutch mechanisms or electrical devices that insure the setting in motion at the proper instant of the sound reproducing mechanism, the film in some cases being weakened by perforations or apertures, or by attaching thereto projections that, in turn must be passed between tension rollers to be separated by the projections to close a circuit. These have been found to have disadvantages, in that the apertured operation weakens the film while the resistance offered the projection in time tears the sprocket tooth opening of the film, and thus in time makes it necessary to remove a section and substitute a new section of the film. In the present instance, a magnetic metal is attached to and carried by the film and when passing in attractive relation to a switch closing electromagnet or permanent magnet, which is swingingly mounted, causes the switch to be closed, and thus in turn energize the necessary mechanism to connect the sound reproducing means with the projector, the drag upon the film during this operation being imperceptible and having no ill effect upon the film.

With the foregoing and other objects in view and which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings: Figure 1 is a rear view of the aperture plate or frame of a motion picture projector with the present switch controller in position thereon. Fig. 2 is a side elevation thereof, showing in diagram the position of the film with its magnetic member. Figs. 3 and 4 are obverse and reverse sides of a film with the magnetic member attached. Fig. 5 is a diagrammatic view of one electrical installation for use with the present switch controller. Fig. 6 is a view in elevation of the clutch controlling mechanism as shown in Fig. 5, and Fig. 7 is a view taken from the left in Fig. 6, the clutch operating lever being omitted.

Referring to the drawings, the numeral 1 designates the aperture plate or frame of a motion picture projector, in which is inserted a nonmagnetic, preferably a brass, plate 2, and to which is secured and projecting from one side thereof at the top an arm 3. In this arm is pivoted for swinging movement a second arm 4, which in turn carries an electromagnet 5, with its attracting pole adjacent the non-magnetic plate 2. Although an electromagnet is here shown, it is apparent that a permanent magnet may be used in a similar manner. Where found necessary, a spring S, is employed to hold the electromagnet a predetermined distance away from the plate 2, for in some cases, the projector is tilted to cause the electromagnet to move too near or too far away from the plate 2. This, however, is a detail that the different positioning of the projectors will require.

Carried by and insulated from the electromagnet 5 is a member 6, which carries the adjustable contact 7 of the electrical switch controlled by the electromagnet, the other member being the contact 7', carried by the block 8 of insulation and in circuit with the binding post 9, all of which are insulated from the plate 2.

The film F as clearly illustrated in Figs. 2, 3 and 4, is provided with a magnetic member 10 which is attached to the film by the clenched prongs or fingers 11, and is of sufficient area to when passing the plate 2, attract the electromagnet 5 and cause the contact 7 to engage the contact 7′, and close an electrical circuit as will presently appear, this action in practice not producing any appreciable drag upon the film. When an electromagnet 5 is employed the same must be energized during the movement of the film, this being accomplished by the circuit 13, as illustrated in Fig. 5. The conductors 14 and 15 are connected respectively to the contact 7 and the binding post 9, and form as will presently appear the necessary circuit connections for connecting and disconnecting the clutches 17 ad 17′, of the projector driven shaft 16 and the two sound reproducing mechanisms A and B, which has shown in Fig. 5, are mere diagrams of the machine shown in my copending application filed November 23, 1914, Serial No. 873,548. Each clutch as therein shown is controlled by its armature lever 18 and 18′, which in turn are each controlled by the throwing electromagnets 19—19′, the locking members 20—20′, and the releasing levers 21—21′, in turn controlled by their electromagnets 22—22′. Thus as illustrated in Fig. 5, when the magnetic member 10 passes in attractive relation to the electromagnet 5, the same is drawn toward the plate 2 and the switch composed of the contacts 7—7′ is closed, causing the following circuit to be made, to-wit:—the battery 23, the conductor 24, the manually controlled switch 25, the contact 26, the conductor 27, the clutch through electromagnet 19 of the mechanism A, the conductor 28, the clutch releasing electromagnet 22′, whose armature lever 21′ operates the locking lever 20′ for releasing the clutch throwing armature lever 18′, of the mechanism B, the conductor 14, the contacts 7 and 7′ and the conductor 15.

To cause the mechanism B to be connected and the mechanism A disconnected, the switch 25 is placed to engage the contact 26′, at which time the closure of the contacts 7—7′, makes the following circuit, to-wit:—the battery 23, the conductor 24, the switch 25, the contact 26′, the conductor 27′, the electromagnet 19′, which attracts the armature lever 18′ and operates the clutch 17′, the conductor 28′, the electromagnet 22, which in turn operates the lock releasing lever 21, and permits the release of the armature lever 18 and the throwing out of the clutch 17 of the mechanism A, the conductors 14′ and 14, the contacts 7 and 7′, and the conductor 15.

The general mode of clutch operation is the same as shown in my pending application Serial No. 873,548, but it is apparent that a single sound reproducing mechanism may be employed and still be within the scope of the present invention. It is also evident that no strain is thrown upon the film, nor is the film weakened by producing slots or air passages through the body thereof, as has been the practice. Any form of switch may be used in lieu of the members 7—7′, they merely having been illustrated to show one method of circuit control.

What is claimed, is:—

1. The combination with a motion picture projector machine and a sound reproducing machine, of mechanism for connecting the two for synchronous operation, including the film, a magnetic member carried by the film, and a switch operating magnet movably mounted to be attracted to the magnetic member as the said member passes in attractive relation to the magnet.

2. The combination with a motion picture projector machine, a sound reproducing machine, and a transmission mechanism between the two, of means for controlling the transmission mechanism, including a magnetic member carried by the film of the projector machine, an electrical circuit having a source of electrical energy, a clutch throwing electrical device, and a switch, and a movably mounted magnet for operating the switch disposed to be attracted to the magnetic member as the said member passes in attractive relation to the magnet.

3. The combination with a motion picture projecting machine, a sound reproducing machine, a transmission mechanism between the two and having a clutch, and a film provided with a magnetic member, of electrical means for operating the clutch, including a circuit having a source of electrical energy, a clutch operating electrical device, and a switch, and a movably mounted magnet for operating the switch as the magnetic member is passed in attractive relation to the magnet.

4. The combination with a motion picture projector, a film, a sound reproducing machine, and a transmission mechanism between the projector and the machine having a clutch, of means for controlling the clutch, including a movably mounted magnet disposed in the path of the film, means carried by the film for attracting and causing the magnet to move, and means controlled by the magnet for causing the operation of the clutch.

5. The combination with a motion picture projector, a film, a sound reproducing mechanism, and a transmission means between the projector and the mechanism, of means for controlling the transmission mechanism to produce synchronous action between the projector and sound reproducing mechanism, including a swingingly mounted magnet disposed to have its pole in the path of the film, means controlled by the magnet for connecting and disconnecting the transmission means, and means carried by the film for causing the swinging of the magnet as such latter means passes the pole of the magnet.

6. The combination with a motion picture projector, a film, a sound reproducing machine, and a transmission means between the projector and the machine and having a clutch, of electrical means for operating the clutch, including a circuit having a source of electrical energy, an electrical device for operating the clutch, and a switch, and a switch operator comprising a movably mounted magnet and a magnetic member, the magnet being carried by the projector in a relative fixed position while the magnetic member is carried by the film, whereby as the magnetic member passes in attractive relation to the magnet, the magnet is moved to actuate the switch.

7. The combination with a motion picture projector, a film, a sound reproducing machine, and means for connecting the two for synchronous movement, of electrical means for controlling the latter means including an electrical circuit having a source of electrical energy, an electrical device, and a switch, and means for operating the switch including a magnet movably mounted upon the projector with its pole in the path of the film, and a magnetic member carried by the film for passage in attractive relation to the magnet.

8. The combination with a motion picture projector, a film, a sound reproducing machine, and means for connecting the two for synchronous movement, of electrical means for controlling the latter means including an electrical circuit having a source of electrical energy, an electrical device, and a switch, and means for operating the switch including a swingingly mounted magnet carried by the projector with its pole in the path of the film, and a magnetic member carried by the film for attracting the magnet and swinging the same to operate the switch.

9. A film controlled switch operating mechanism, including the aperture plate of a motion picture projector machine, a magnet swingingly connected thereto, a switch, one member of which is connected to the magnet and the other of which is in the path of the first switch member, and a magnetic member carried by the film and for causing the magnet to be moved in one direction by the attractive force as the magnetic member passes the pole of the magnet.

10. A film controlled switch operating mechanism, including the motion picture projector, a magnet swingingly connected thereto with its pole in close proximity to the path of the film, a two membered switch, one member of which is controlled by the magnet and the other of which is in the path of the first switch member, and a magnetic member carried by the film, whereby as the magnetic member passes the pole of the magnet the magnet is swung to operate the switch.

In testimony whereof I affix my signature in presence of two witnesses.

CHARLES W. EBELING.

Witnesses:
   Bernard M. Berkowitz,
   Thomas M. Stenson.